United States Patent
Skiscim et al.

(10) Patent No.: US 8,064,551 B2
(45) Date of Patent: Nov. 22, 2011

(54) DETERMINING BURST TRANSMISSION SIGNALS

(75) Inventors: Christopher C. Skiscim, Bethesda, MD (US); Richard Candell, Jr., Clarksburg, MD (US); Ralph Eugene Crenshaw, Crownsville, MD (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 797 days.

(21) Appl. No.: 12/101,391

(22) Filed: Apr. 11, 2008

(65) Prior Publication Data

US 2009/0257532 A1    Oct. 15, 2009

(51) Int. Cl.
H03D 1/00    (2006.01)
H04L 27/06   (2006.01)

(52) U.S. Cl. ........ 375/343; 375/142; 375/150; 455/466; 455/67.13; 455/67.11; 455/511

(58) Field of Classification Search .......... 375/142, 375/150, 343; 455/466, 67.3, 67.1, 511
See application file for complete search history.

(56) References Cited

U.S. PATENT DOCUMENTS

| 5,724,384 | A  | * | 3/1998  | Kim et al.   | 375/149 |
|-----------|----|---|---------|--------------|---------|
| 5,796,777 | A  | * | 8/1998  | Terlep et al.| 375/227 |
| 5,983,111 | A  | * | 11/1999 | Kim          | 455/466 |
| 6,763,056 | B1 | * | 7/2004  | Ohsuge       | 375/140 |
| 6,768,729 | B1 | * | 7/2004  | Ohsuge       | 370/342 |
| 2003/0161428 | A1 | * | 8/2003  | Garrett et al.  | 375/368 |
| 2006/0140314 | A1 | * | 6/2006  | Kim et al.      | 375/343 |
| 2007/0116158 | A1 | * | 5/2007  | Guo et al.      | 375/343 |
| 2007/0117515 | A1 |   | 5/2007  | Sinibaldi et al.| 455/67.11 |
| 2007/0291826 | A1 | * | 12/2007 | Hafuka          | 375/148 |
| 2009/0135954 | A1 | * | 5/2009  | Salhov et al.   | 375/317 |
| 2009/0175299 | A1 | * | 7/2009  | Hosokawa et al. | 370/503 |

OTHER PUBLICATIONS

Berthet, G., et al. "Synchronization Complexity for a Satellite Multimedia Burst Receiver," Nera SatCom, undated, 5 pages.

* cited by examiner

*Primary Examiner* — Shuwang Liu
*Assistant Examiner* — Sung Ahn
(74) *Attorney, Agent, or Firm* — Morgan, Lewis & Bockius LLP

(57) ABSTRACT

Described are computer-based methods and apparatuses, including computer program products, for determining burst transmission signals. A receiver receives radio frequency data from a data source through a network. The receiver converts the radio frequency data to digital data. The receiver converts the digital data to baseband data. The receiver generates a correlation magnitude from the baseband data based on one or more correlation templates. The receiver determines one or more statistics based on the correlation magnitude and stored statistics. The receiver determines the presence of a burst transmission signal based on a comparison of a threshold value computed as a function of the statistics and the correlation magnitude. If the correlation magnitude exceeds the computed threshold, the receiver demodulates the burst transmission signal to packet data and transmits the packet data to a server.

18 Claims, 6 Drawing Sheets

| Time (secs) | Correlation Magnitude | Detection Threshold | Action |
|---|---|---|---|
| 1 | 24 | 32 | Discard |
| 2 | 25 | 34 | Discard |
| 3 | 45 | 38 | Transmit |
| 4 | 20 | 30 | Discard |
| 5 | 34 | 32 | Transmit |
| 6 | 10 | 31 | Discard |
| 7 | 30 | 32 | Discard |
| 8 | 31 | 33 | Discard |
| 9 | 38 | 33 | Transmit |
| 10 | 28 | 34 | Discard |

FIG. 5

DETERMINING BURST TRANSMISSION SIGNALS

FIELD OF THE INVENTION

The present invention relates generally to computer-based methods and apparatuses, including computer program products, for determining burst transmission signals.

BACKGROUND

The format of a transmitted burst signal typically consists of a unique word (UW) followed by the user data. The length of the UW is determined by the desired acquisition probability and signal-to-noise ratio (SNR) of the received signal. A burst signal is said to be detected if the UW is detected. This is accomplished by correlating the received signal with the reference UW.

In a synchronous code division multiple access (CDMA) system, the received signal is typically represented as r=Sd+n where d is the data source, S is the modulation and n is the noise. In the absence of a signal, the receiver observes the noise component n. The noise n is composed of many component signals.

Typically, the detection of a signal of interest is usually done by correlating the incoming signal r with a one of a set of known bit sequences that are preambles to the user message. If the magnitude of the correlation of the signal r with the unique word is large enough, a burst detection is said to have occurred. The threshold above which a correlation magnitude is declared "large enough" must therefore be established. If the threshold is too low, large numbers of false detections occur causing congestion in the receiver. If the threshold is too high, otherwise valid messages are missed.

SUMMARY OF THE INVENTION

One aspect to determining burst transmission signals is a method. The method includes receiving, at a burst transmission detector module, one or more correlation magnitudes. The method further includes determining a statistic based on the one or more correlation magnitudes and one or more stored statistics and determining a burst transmission signal based on a comparison of the statistic and the one or more correlation magnitudes.

Another aspect to determining burst transmission signals is a computer program product. The computer program product is tangibly embodied in an information carrier. The computer program product includes instructions operable to cause a data processing apparatus to receive one or more correlation magnitudes. The computer program product further includes instructions operable to cause a data processing apparatus to determine a statistic based on the one or more correlation magnitudes and one or more stored statistics and determine a burst transmission signal based on a comparison of the statistic and the one or more correlation magnitudes.

Another aspect to determining burst transmission signals is a system. The system includes a burst transmission module. The burst transmission module is configured to receive one or more correlation magnitudes. The burst transmission module is further configured to determine a statistic based on the one or more correlation magnitudes and one or more stored statistics and determine a burst transmission signal based on a comparison of the statistic and the one or more correlation magnitudes.

Another aspect to determining burst transmission signals is a system. The system includes a means for receiving one or more correlation magnitudes. The system further includes a means for determining a statistic based on the one or more correlation magnitudes and one or more stored statistics and a means for determining a burst transmission signal based on a comparison of the statistic and the one or more correlation magnitudes.

In other examples, any of the aspects above can include one or more of the following features. The burst transmission signal is determined based on a comparison of a threshold value of the statistic and the one or more correlation magnitudes. The threshold value is predetermined.

In some examples, the threshold value is dynamically determined based on the correlation magnitude, the one or more stored statistics, data channel information, and/or data channel congestion. The correlation magnitudes and/or the statistic are stored at a storage module. The statistic is determined based on the one or more correlation magnitudes and one or more weighted statistics.

In other examples, the one or more stored statistics are dynamically weighted based on a time associated with each stored statistic and/or receiver information. The statistic is determined by utilizing an average, a mean, a standard deviation, a smoothed average, and/or an exponential moving average.

In some examples, the statistic is determined based on the one or more correlation magnitudes, the one or more stored correlation magnitudes, and a smoothing parameter. The smoothing parameter is dynamically determined based on a number of false detections of burst transmission signals.

In other examples, the correlation magnitude is generated at the burst transmission detector module from baseband data based on one or more correlation templates. Digital data is received at a digital down converter module. The digital data is converting at the digital down converter module to the baseband data.

In some examples, radio frequency data is received at a analog-to-digital converter module. The radio frequency data is converted to the digital data at the analog-to-digital converter module.

In other examples, the burst transmission signal includes one or more data packets. The burst transmission signal is demodulated to form packet data by a demodulator module. The packet data is transmitted to a server.

In some examples, the burst transmission module is further configured to determine the burst transmission signal based on a comparison of an threshold value of the statistic and the one or more correlation magnitudes. The burst transmission module is further configured to dynamically determine the threshold value based on the correlation magnitude, the stored statistics, data channel information, and/or data channel congestion.

In other examples, a storage module is configured to store the one or more correlation magnitudes and/or the statistic. A demodulator module is configured to demodulate the burst transmission to form packet data.

Any of the aspects and/or examples described herein can utilize one or more of the following advantages. An advantage is that a detection threshold can be dynamically adjusted based on the network conditions and/or the received signal, which decreases false detections and increases the overall efficiency of the system. Another advantage is that summary statistics gathered as a by-product of computing the correlations can be used to infer the level of interference/noise of the channel. These statistics can be updated in a computationally efficient and flexible manner, and used to adjust the detection threshold. The system is thus able to automatically compensate for changing channel conditions.

An additional advantage is that the threshold amount can be dynamically updated based on the receiver environment and/or the channel environment, which enables the decrease in false detections of burst transmission signals. Another advantage is that the receiver can be utilized as a multi-user receiver that is adaptable to multiple data sources and/or networks, which decreases the overall cost of operating a receiver in multi-user mode.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 5 is an exemplary table illustrating correlation magnitudes over time.

DETAILED DESCRIPTION

In general overview, a multi-user receiver receives radio frequency data from a plurality of data sources (e.g., satellites, cell phones, radio transmitters, etc.) through a network and/or set of data radio frequency channels. The receiver converts the radio frequency data to digital data. The receiver converts the digital data to baseband data. The receiver generates a correlation magnitude from the baseband data based on one or more correlation templates. The receiver determines one or more statistics based on the correlation magnitude and stored statistics. The receiver determines the presence of a burst transmission signal based on a comparison of a threshold value computed as a function of the statistics and the correlation magnitude. If the correlation magnitude exceeds the computed threshold, the receiver demodulates the burst transmission signal to packet data and transmits the packet data to a server.

Figure 1:
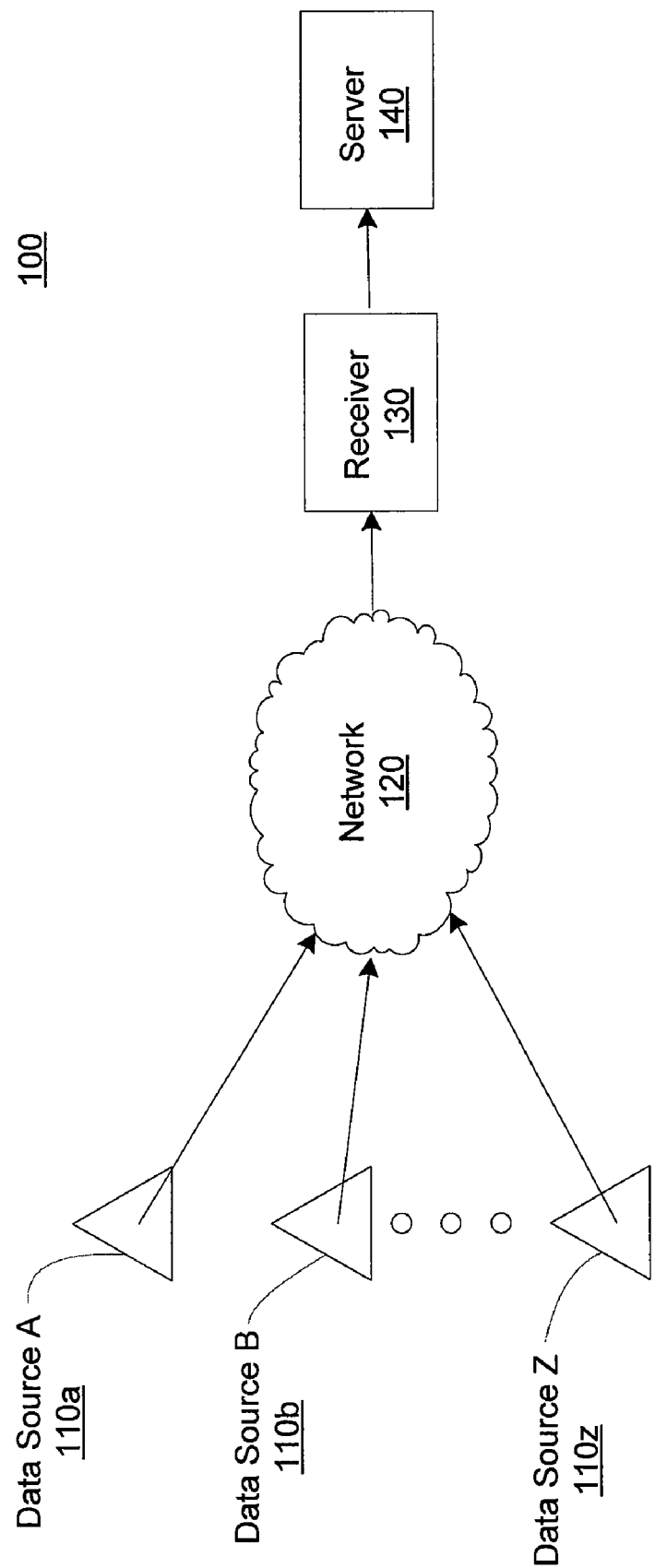
FIG. 1 is an exemplary system with a plurality of data sources.

In some example, the receiver determines a burst transmission signal based on a comparison of the statistic and the correlation magnitude. The system for determining burst transmission signals and the aspects of the system including the receiver, burst transmission signals, and exemplary correlation magnitudes over time are further described below.
System FIG. 1 is an exemplary system 100 with a plurality of data sources 110a, 110b, and 110z (generally 100). The system 100 includes the data sources 110, a network 120, a receiver 130, and a server 140. The data sources 110 (e.g., transmitting device, satellite, etc.) transmit radio frequency data through the network 120 (e.g., wireless network, wired network, etc.) to the receiver 130.

The receiver 130 converts the radio frequency data to digital data. The receiver 130 converts the digital data to baseband data. The receiver 130 generates one or more correlation magnitudes (e.g., ten units, thirty four units, etc.) from the baseband data based on one or more correlation templates. The receiver 130 computes one or more statistics based on the correlation magnitude(s). By functionally combining the newly gathered statistic(s) with the stored statistic(s), a new threshold value is computed. If the correlation magnitude exceeds the newly computed threshold, a burst transmission signal is determined to be present. The digital data associated with this correlation value is then sent for demodulation. The receiver 130 demodulates the burst transmission signal into packet data and transmits the packet data to the server 140 (e.g., application server, radio server, delivery server, location server, web server, etc.). The advantages are multi-fold: The computation of the statistic(s) is computationally and storage efficient; The functional form of computing the threshold value is driven by parameters that allow a tradeoff between the level of false detections and valid detections; Computing of the threshold value is computationally efficient.

Although FIG. 1 illustrates three data sources 110, the system 100 can include any number of data sources (e.g., ten, twenty, one hundred, five thousand). The receiver 130 can receive radio frequency data from a plurality of data sources. The data sources 110 can be identical (e.g., all of the data sources 110 are radios, etc.) or the data sources 110 can be intermixed among different data source types (e.g., data source A 110a is a radio and data source B 110b is satellite phone).

Although FIG. 1 illustrates one network 120, the receiver 130 can be connected to a plurality of networks (e.g., ten, forty, two hundred). Each network has a plurality of data sources (e.g., 110) that transmit radio frequency data to the receiver 130.

Figure 2:
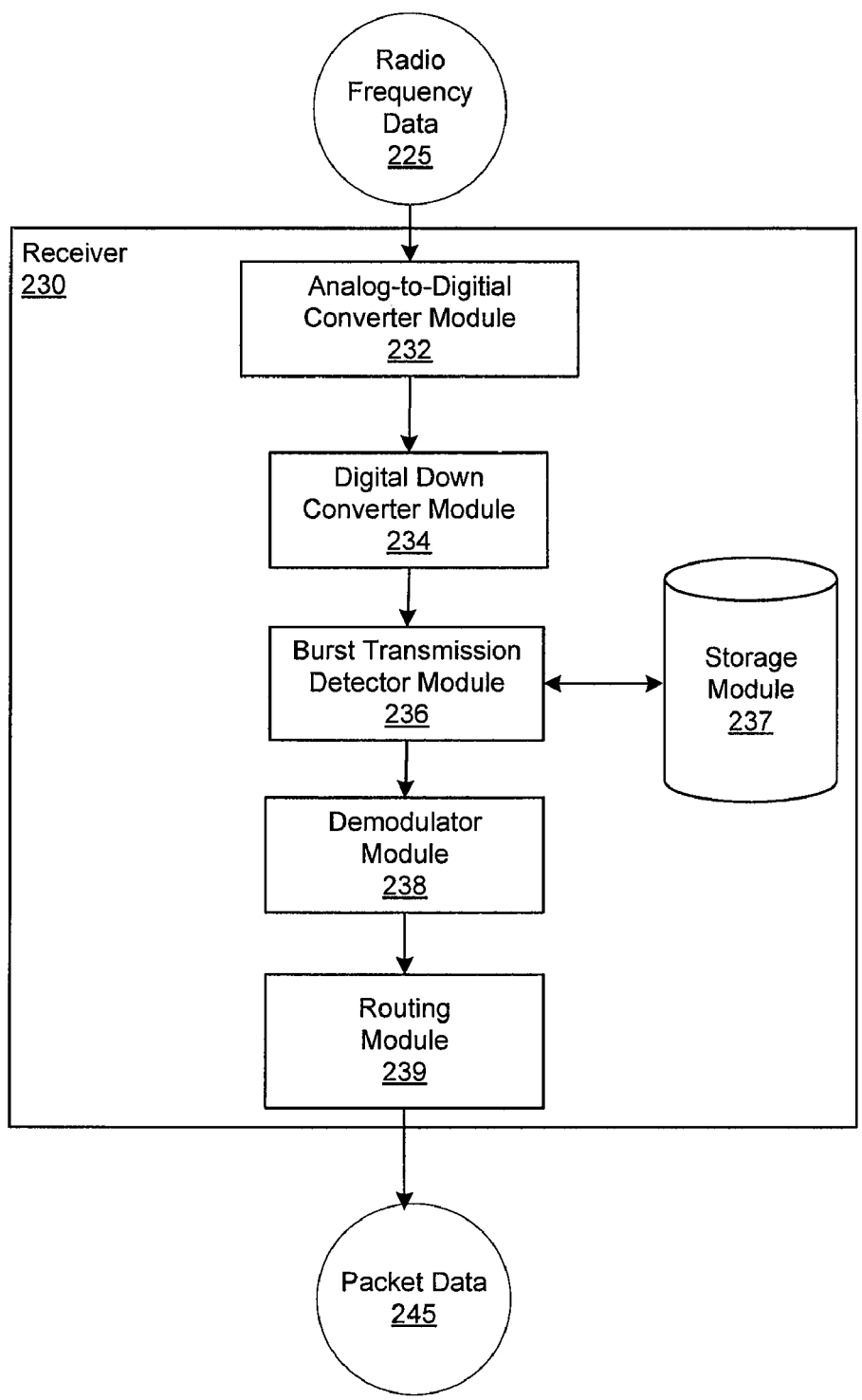
FIG. 2 is an exemplary receiver that receives radio frequency data and transmits packet data.

Although FIG. 1 illustrates one server 140, the receiver 130 can forward packet data to a plurality of servers (e.g., five, twenty, fifty, one hundred). The forwarding of the packet data can be based on routing information within the packet data and/or one or more routing rules applied to the packet data. For example, the routing rules can include all location data is routed to a location server (not shown). As another example, the routing rules can include all packet data is routed to a delivery server (not shown).
Receiver FIG. 2 is an exemplary system 200 with a receiver 230 that receives radio frequency data 225 and transmits packet data 245. The receiver 230 includes an analog-to-digital converter module 232, a digital down converter module 234, a burst transmission detector module 236, a storage module 237, a demodulator module 238, and a routing module 239.

The analog-to-digital converter module 232 receives radio frequency data 225 (e.g., spread spectrum data, CDMA data, etc.) from one or more data sources 110 of FIG. 1 utilizing one or more data channels through the network 120. The analog-to-digital converter module 232 converts the radio frequency data 225 into digital data at rate $f_s$ (e.g., 337,500 samples per second, 123,420 samples per second). The digital down converter 234 receives the digital data at rate $f_s$ and converts the digital data to baseband data (e.g., data that starts at or near 0 Hz, etc.) at rate f.

The burst transmission detector module 236 receives the baseband data at rate f. The burst transmission detector module 236 converts the baseband data at rate f to one or more correlation magnitudes based on one or more correlation templates (e.g., each template includes a conversion for data at a certain frequency, each template includes an encoding for data at a certain frequency, each template includes a conversion from a plurality of samples per second to a correlation magnitude, etc.).

The burst transmission detector module 236 determines the presence of a burst transmission signal based on a comparison of a threshold value with the correlation magnitudes. The burst transmission detector module 236 determines the threshold value based on the correlation magnitudes and a function of one or more stored statistics. The storage module 237 stores the statistics and can retrieve the stored statistics for use by the burst transmission detector module 236.

If there is a burst transmission signal within the correlation magnitudes, then the burst transmission detector module 236 transmits the burst transmission signal to the demodulator module 238. The demodulator module 238 demodulates the correlation magnitudes to form packet data 245 and communicates the packet data to the routing module 239. The routing module 239 transmits the packet data 245 to a server. The server can be selected from a plurality of servers based on one or more routing policies.

Although FIG. 2 illustrates the burst transmission detector module 236 receiving the baseband data from the digital down converter module 234, the burst transmission detector module 236 can receive data from any type of module and/or a data source 110. Although FIG. 2 illustrates the burst transmission detector module 236 transmitting the burst transmission signal to the demodulator module 238, the burst transmission detector module 236 can transmit the burst transmission signal to any type of module and/or the server 140.

In some examples, the burst transmission detector module 236 converts the baseband data at rate f to one or more correlation magnitudes based on one or more correlation templates such that there is a correlation magnitude at each sample time t. For example, the baseband data at rate f includes 100,000 samples per second and the correlation template converts the 100,000 samples during one sample interval into one or more correlation magnitudes by application of Equation 2 (in this example, the average magnitude for the 100,000 samples is 35).

In other examples, the receiver 230 receives radio frequency data from multiple users and can nearly simultaneously process the radio frequency data from the multiple users. The storage module 237 can associate the stored correlation statistics from each user thereby providing each user with individual statistical determinations by the burst transmission detector module 236. In other examples, the storage module 237 associates the stored statistics from a plurality of users, which are associated with a data channel together for the determination of the statistic by the burst transmission detector module 236. An advantage of utilizing the stored statistics from a plurality of users is that the statistic will utilize a variety of data channel information, which increases the efficiency of the receiver 230 and decreases the number of false detections.

Burst Transmission Signals

Figure 3:
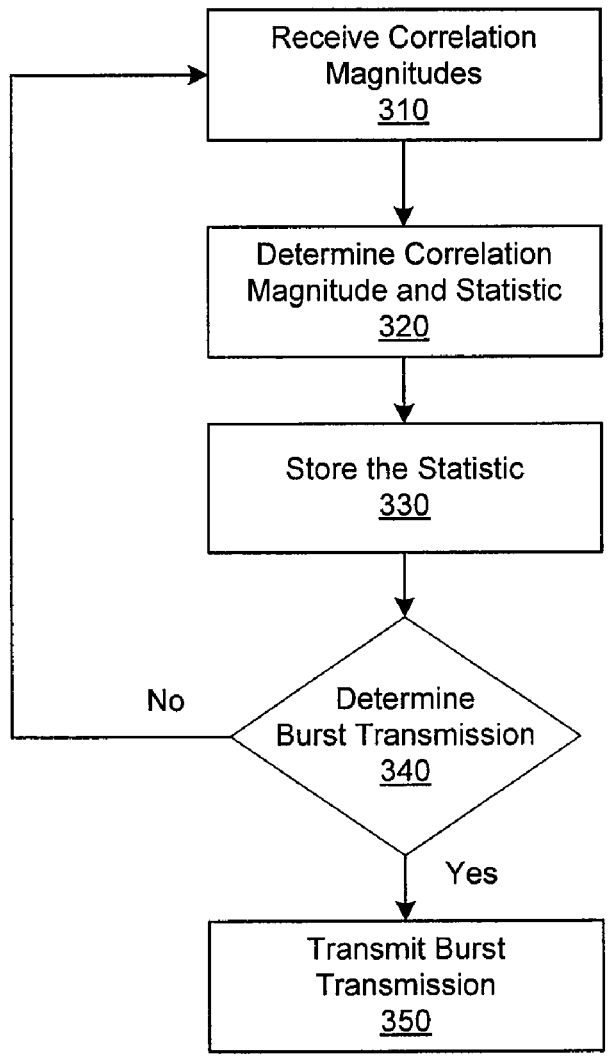
FIG. 3 is an exemplary flowchart illustrating burst transmission.

FIG. 3 is an exemplary flowchart 300 illustrating burst transmission signals through the exemplary receiver 230 of FIG. 2. The burst transmission detector module 236 receives (310) correlation magnitudes from the digital down converter module 234. The burst transmission detector module 236 determines (320) one or more correlation magnitudes and one or more statistics based on the correlation magnitudes. The storage module 237 stores (330) the statistics.

The burst transmission detector module 236 determines (340) if there is a burst transmission signal based on a comparison of the threshold value determined as a function of the statistics and the correlation magnitudes. If a burst transmission signal is detected, then the burst transmission detector module 236 transmits (350) the burst transmission signal to the demodulator module 238. If there is not a burst transmission signal, then the burst transmission detector module 236 receives (310) additional correlation magnitudes and the determination of burst transmission signals as described above is repeated.

In some examples, the burst transmission detector module 236 determines (320) the threshold value based on the one or more correlation magnitudes and one or more stored statistics that are weighted. The burst transmission detector module 236 can dynamically weight the stored statistics and threshold value based on a time associated with each of the stored statistics and channels.

In other examples, the burst transmission detector module 236 determines (320) the threshold value based on the one or more correlation magnitudes, the one or more stored statistics, and one or more associated smoothing parameters. The burst transmission detector module 236 can dynamically determine a smoothing parameter based on a number of false detections of burst transmission signals. The smoothing parameter can be set to smooth the detection thresholds such that correlation magnitudes outside of the normally received data (e.g., statistical outliers) do not cause significant changes (e.g., spikes, dips) in the detection threshold. The number of false detections can be determined by the burst transmission detector module 236, determined by the demodulator module 238, and/or received from the server 140 of FIG. 1. An advantage of the smoothing parameter is that the statistic can be modified to decrease false detections which increases the efficiency of the receiver 230 and the server 140.

In other examples, the burst transmission detector module 236 determines (340) the presence of a burst transmission signal based on a comparison of a threshold value and the one or more correlation magnitudes (e.g., threshold value=25 and correlation magnitude=24; threshold value=34 and correlation magnitudes=36, 45, 23, and 23; etc.). The threshold value can be dynamically determined based on the statistics concerning the correlation magnitudes.

Figure 4:
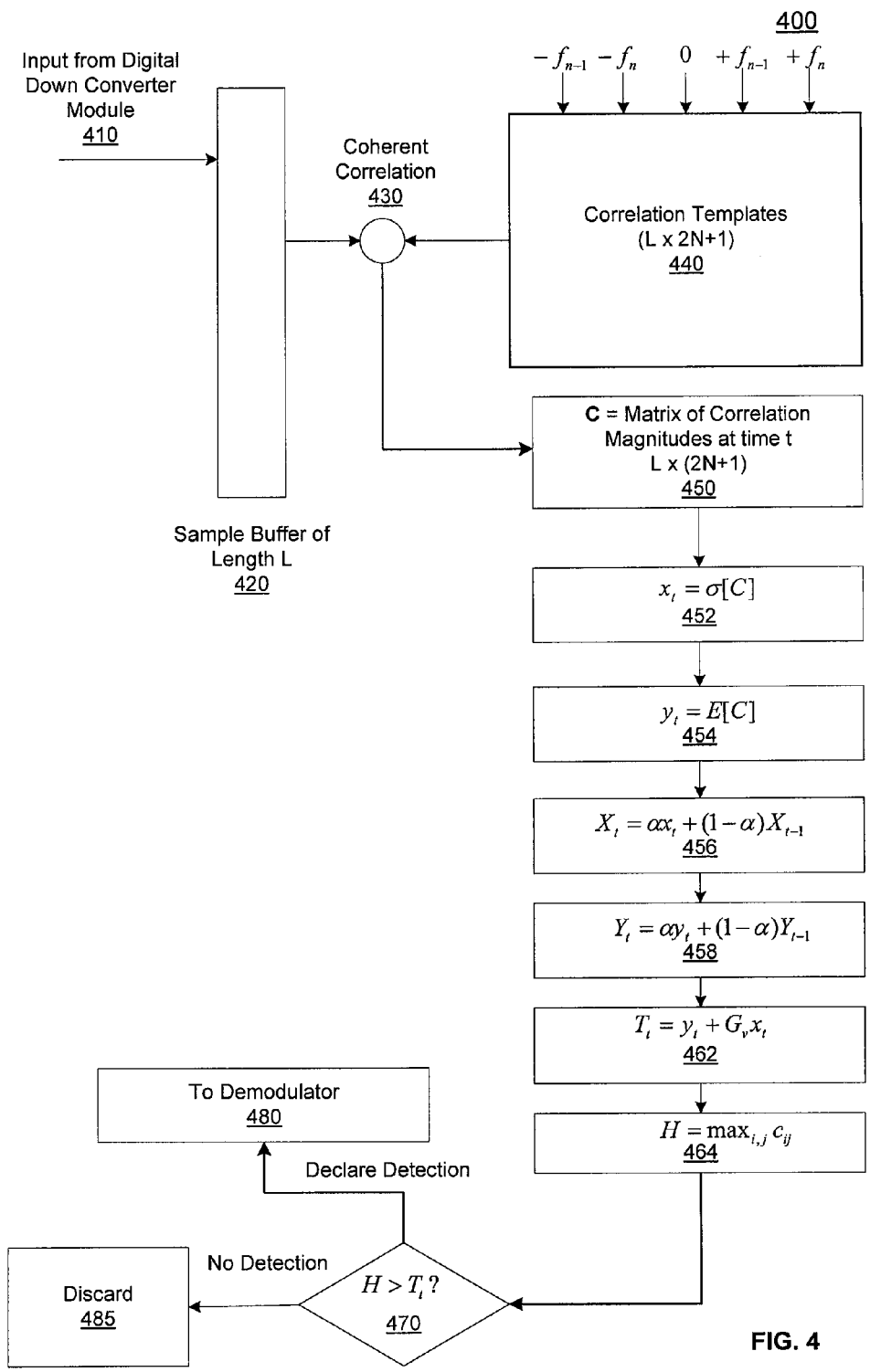
FIG. 4 is an exemplary flowchart illustrating burst transmission signal detection.

FIG. 4 is an exemplary flowchart 400 illustrating burst transmission signals through the exemplary receiver 230 of FIG. 2. The burst transmission detector module 236 receives input (410) from the digital down converter module 234. The burst transmission detector module 236 samples (420) the input utilizing a buffer of length L. The burst transmission detector 236 utilizes a coherent correlation (430) based on one or more correlation templates (440) to form a matrix of correlation magnitudes at time t (450). The burst transmission detector module 236 utilizes a set of equations (452), (454), (456), (458), (462), (464), and (470) to determine the presence of a burst transmission signal based on a comparison of the calculated threshold value and the correlation magnitudes. If a burst transmission signal is detected, then the burst transmission signal is transmitted (480) to the demodulator module 238. If a burst transmission signal is not detected, then the burst transmission signal is said to be not detected. (485). The set of equations and matrixes referenced above is described below.

The input (410) from the digital down converter module 234 can be denoted by $r_m$ and the unique word (UW) by $s_m$. A coherent correlator (430) can be of the form of Equation 1. In Equation 1, L is the number of complex samples in the UW, s* is the complex conjugate of s, and $|\cdot|$ is the magnitude of a complex number.

Exemplary coherent correlator.

$$c_m = \left| \sum_{i=0}^{L-1} r_{m+i} \times s_i^* \right| \qquad \text{Equation 1}$$

Typically, the coherent correlation (430) can be performed across a set of m frequencies. As the correlation progresses in time, the result is an n×m matrix C (450) of values $C_{mag}$ representing the correlation magnitude at a particular frequency and time.

The burst transmission detector module 236 includes one or more correlation templates (440). The one or more correlation templates (440) include a matrix P, the columns of the matrix P encode the UW at a set of frequencies centered f (referred to as $f_0$). The columns of P are equidistant from $f_0$ and have frequency values as illustrated below.

$$\{-f_n, -f_{n-1}, \ldots, f_0, \ldots, f_{n-1}, f_n\}.$$

The length of each column is L and is chosen such that the encoded UW is of length L. A column k of P can be represented as Equation 2.

Exemplary column $k$ of $P$.

$$P_k = UW * e^{-j2\pi \frac{f_k}{f_s} L} \qquad \text{Equation 2}$$

The dimension of the correlation template matrix (440) is L×2n+1. The correlation magnitude is calculated according to Equation 1 above.

In the absence of an actual message (also referred to as a burst transmission signal), the output of the correlation process over time and frequency can be modeled as a stochastic process governed by a probability distribution with mean E[C] and standard deviation σ. A valid correlation produces a correlation magnitude that will typically be some distance above E[C]. However, a purely random sequence may produce a high value for E[C] leading to a false detection.

In other examples, exponential smoothing can be utilized for mean and/or variance calculations of the correlation magnitudes.

In some examples, detection can be stopped when the determination process is starting. The stopping and/or starting of the determination process is expressed utilizing the variable $T_{init} \geq 0$. The initial value for the exponentially smoothed moment $x_t$ can be initialized to either zero or more conveniently $x_0$, the first correlation magnitude encountered.

The point estimate $x_t$ is calculated based on the standard deviation of the matrix C at time t. The equation (452) utilizes Equation 3.

$$x_t = \sigma[C]$$

Equation 3: Exemplary initialization of $x_t$.

The point estimate $y_t$ is calculated based on the average of the matrix C at time t. The equation (454) utilizes Equation 4.

$$y_t = E[C]$$

Equation 4: Exemplary initialization of $y_t$.

At each time increment t, the point estimate $x_t$ is utilized according to Equation 5 (456) where the smoothing parameter α is 0≦α≦1 (e.g., α=0.0075, α=0.075, etc.). Equation 5 is utilized to estimate the point estimate $X_t$ of the correlation magnitude while utilizing the stored statistic $X_{t-1}$. In equation 5, when α is close to one, then new observations $x_t$ are reflected in the point estimate $X_t$. However, when a can be adjusted between zero and one to allow the system to responsive to short term changes or long term changes. An advantage of utilizing the stored statistic and the smoothing parameter is that the history of previous standard deviations can be utilized while maximizing the storage capacity of the system.

$$X_t = \alpha x_t + (1-\alpha) X_{t-1}$$

Equation 5: Exemplary point estimate.

At each time increment t, the point estimate $y_t$ is utilized according to Equation 6 (458) where the smoothing parameter α is 0≦α≦1 (e.g., α=0.0075, α=0.075, etc.). Equation 6 is utilized to estimate the point estimate $Y_t$ of the correlation magnitude while utilizing the stored statistic $Y_{t-1}$. In equation 6, when α is close to one, then new observations $y_t$ are reflected in the point estimate $Y_t$. However, when α can be adjusted between zero and one to allow the system to responsive to short term changes or long term changes. An advantage of utilizing the stored statistic and the smoothing parameter is that the history of previous averages can be utilized while minimizing the storage capacity of the system.

$$Y_t = \alpha y_t + (1-\alpha) Y_{t-1}$$

Equation 6: Exemplary point estimate.

Equation 7 (462) calculates the detection threshold at a time t. In Equation 7, the threshold at time t is denoted by $T_t$, $y_t$ is the average of the matrix C at time t, $G_v$ provides the threshold amount for the sensitivity of the detection process, and $x_t$ is the standard deviation of the matrix C at time t. The threshold amount $G_v$ can be predetermined and/or dynamically determined based on the correlation magnitude, the stored correlation statistics, data channel information, and/or data channel congestion.

$$T_t = y_t + G_v x_t$$

Equation 7: Exemplary detection threshold.

In other examples, the detection threshold can be determined based on Equation 8.

$$T_t = G_v x_t$$

Equation 8: Another exemplary detection threshold.

Equation 9 (464) calculates the H which is the maximum candidate correlation magnitude measure for some element $c_{ij}$ in the matrix C $$H = \max_{i,j} c_{ij}$$

Equation 9: Exemplary maximum candidate correlation magnitude measure.

Equation 10 (470) calculates whether H is greater then the detection threshold $T_t$. If the H is greater then the detection threshold $T_t$, then a detection is declared and the burst transmission detector module 236 determines a burst transmission signal from the correlation magnitude. The burst transmission detector module 236 transmits (480) the burst transmission signal to the demodulator module 238. If the H is not greater then the detection threshold $T_t$, then a detection is not declared and the burst transmission detector module 236 discards (485) the candidate correlation magnitude.

$$H > T_t$$

Equation 10: Exemplary detection.

Although FIG. 4 illustrates the burst transmission detector module 236 utilizing a set of equations (452), (454), (456), (458), (462), (464), and (470), the burst transmission detector module 236 can utilize other equations and/or matrixes to determine burst transmission signals. For example, the burst transmission detector module 236 can utilize a Markov Inequality equation, a Chebyshev Inequality equation, and/or any other type of equation to determine the burst transmission signals.

Correlation Magnitudes Over Time

FIG. 5 is an exemplary table 500 illustrating correlation magnitudes over time. The table 500 includes columns of time 510, correlation magnitudes 520, detection threshold 530, and actions 540. As illustrated in the table 500, at the time of 5 seconds, the maximum correlation magnitude is 34 and the detection threshold is 32 (the statistic for this example). As such, the burst transmission detector module 236 determines a burst transmission signal from the comparison of the statistic (in this example, the detection threshold of 32) and the correlation magnitude (in this example, the correlation magnitude is 34). The burst transmission detector module 236 transmits the burst transmission signal to the demodulator module 238.

As further illustrated in the table 500, the detection threshold changes over time based on the correlation magnitude at the time and the stored statistics. For example, at the time of 7 seconds, the detection threshold is 32. The burst transmission detector module 236 determines the detection threshold at time 7 based on the detection threshold of 32 and the stored detection thresholds at times 1 through 6 (in this example, the statistics).

For example, the burst transmission detector module 236 receives (310) the correlation magnitude of 24 from the digital down converter module 234 at time 1. The burst transmission detector module 236 determines (320) a statistic (in this example, the detection threshold minus an threshold value) based on the correlation magnitude of 24 and stored statistics. The storage module 237 stores (330) the statistic. However, at time 1, there are no stored statistics for the data source, so the detection threshold is determined (320) based on the correlation magnitude and an threshold value (in this example, 8). In other examples, at time 1, since there are no stored statistics for the data source, the detection threshold is determined based on the correlation magnitude (in this example, detection threshold=24).

The burst transmission detector module 236 determines (340) if there is a burst transmission signal based on a comparison of the statistic (in this example, the detection threshold of 32) and the correlation magnitude of 24. Since there is not a burst transmission signal (correlation magnitude of 24 is less than the detection threshold of 32), then the burst transmission detector module 236 discards the correlation magnitude at time 1 as indicated in table 500.

As another example, the burst transmission detector module 236 receives (310) the correlation magnitude of 45 from the digital down converter module 234 at time 3. The burst transmission detector module 236 determines (320) a statistic (in this example, the detection threshold) based on the correlation magnitude of 45 and stored statistics from time 1 and time 2. The storage module 237 stores (330) the statistic. As such, the burst transmission detector module 236 utilizes a smoothed average to calculate the detection threshold (in this example, the detection threshold is 38) based on the current correlation magnitude at time 3 and the stored statistics from times 1 and 2. In other examples, the burst transmission detector module 236 only utilizes the last stored statistic to determine the statistic. For example, the burst transmission detector module 236 determines (320) a statistic at time 4 based on the correlation magnitude at time 4 and the stored statistic from time 3.

The burst transmission detector module 236 determines (340) if there is a burst transmission signal based on a comparison of the statistic (in this example, the detection threshold of 38) and the correlation magnitude of 45. Since there is a burst transmission signal (correlation magnitude of 45 is greater than the detection threshold of 38), then the burst transmission detector module 236 transmits (350) the burst transmission signal to the demodulator module 238.

For example, the burst transmission detector module 236 determines (320) a statistic by utilizing the average of the correlation magnitude at time 5 (in this example, correlation magnitude is 34) and the stored statistics at times 1 through 4 (in this example, the stored statistics are 32, 34, 38, and 30, respectively). As such, the average of the correlation magnitudes and the stored statistics is 33.6. In this example, the burst transmission detector module 236 determines (340) the burst transmission signal based on the threshold value of the statistic (in this example, the average which is 33.6) and the correlation magnitude (in this example, the correlation magnitude is 34). The threshold value of the statistic is predetermined at −1.6. Therefore, the detection threshold at time 5 is 32. The burst transmission detector module 236 determines (340) a burst transmission signal based on a comparison of the threshold value of the statistic, 32, and the correlation magnitude, 34. Since the correlation magnitude is greater than the threshold value of the statistic, then the burst transmission detector module 236 transmits (350) the burst transmission signal to the demodulator module 238.

As another example, the burst transmission detector module 236 dynamically weights the stored statistics based on a time associated with each stored statistic as illustrated in Table 500. For the correlation magnitude 34 at time 5, the burst transmission detector module 236 dynamically weights the stored statistics at times 1 through 4 as illustrated in Table 1 below. As such, the weighted average at time 5 is 33.4 and the threshold value is predetermined at 0.958. Thus, the detection threshold at time 5 is 32 (in this example, the weighted average, 33.4, multiplied by the threshold value, 0.958).

TABLE 1

Exemplary weights for stored statistics.

| Time (secs) | Statistic | Weight Multiplier | Weight |
|---|---|---|---|
| 1 | 32 | 2 | 64 |
| 2 | 34 | 4 | 136 |
| 3 | 38 | 6 | 228 |
| 4 | 30 | 8 | 240 |
| Totals | | 20 | 668 |
| Weighted Average | | | 33.4 |

Figure 6:
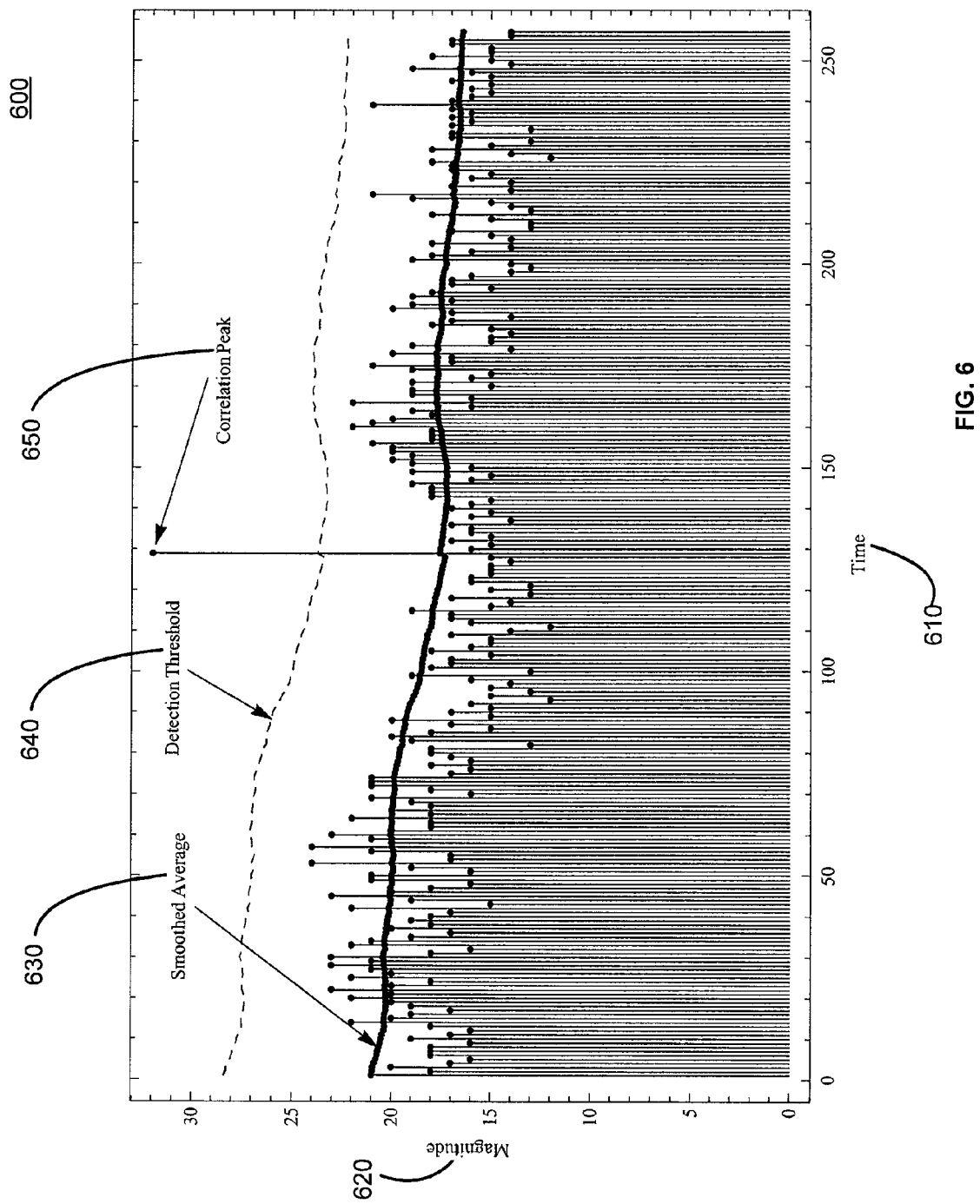
FIG. 6 is an exemplary chart illustrating correlation magnitudes over time.

FIG. 6 is an exemplary chart 600 illustrating correlation magnitudes over time. The chart 600 includes the magnitudes 620 over time 610. The chart 600 includes the smoothed average 630 (in this example, the statistic) and the detection threshold 640 (in this example, the threshold value of the statistic). As illustrated in the chart 600, there is a single detected burst at the correlation peak 650. As such, the other correlation magnitudes do not exceed the detection threshold 640.

Although FIG. 6 illustrates the correlation magnitudes over time where time is in seconds, the burst transmission detector module 236 of FIG. 2 can receive correlation magnitudes over parts of a second. For example, the burst transmission detector module 236 receives a correlation magnitude at each millisecond such that each correlation magnitude represented for one second in chart 600 represent one thousand correlation magnitudes.

In some examples, the burst transmission detector module 236 determines (320) the statistic by utilizing an average, a mean, a standard deviation, a smoothed average, an exponential moving average, and/or any other type of statistical method. For example, as illustrated in chart 600, the burst transmission detector module 236 utilizes a smoothed average 630 to determine (330) the statistic.

In other examples, the receiver 230 receives data frequency data over a data channel. The data channel can be, for example, a L-Band communications channel and/or any other type of satellite communications channel. The L-Band communications channel can employ telecommunication services from, for example, Mobile Satellite (MSAT), INMARSAT, Thuraya, Artemis, ACeS, and/or OPTUS.

In some examples, the receiver 230 receives data frequency data by employing Digital Spread Spectrum Code Division Multiple Access (DSS-CDMA). In some implementations of DSS-CDMA, the radio frequency data is combined with deliberate "noise" data and transmitted in a "burst" of bits that are spread over a range of frequencies. The DSS-CDMA methodology makes the transmission extremely difficult to detect (known as Low Probability of Detection or "LPD"). Even if a transmission is detected and captured, it is even more difficult to decode the message content (known as Low Probability of Interception or "LPI"). DSS communication is also much less subject to RF noise or signal jamming. This provides a very high level of security and reliability for the system 100 of FIG. 1. An advantage of utilizing the burst transmission detector module 236 with DSS-CDMA transmissions is that the burst transmission detector module 236 can efficiently filter out the inserted noise while still detecting valid burst transmission signals.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a network).

The network can include a packet-based network and/or a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for determining burst transmission signals, the method comprising:
   converting, at a burst transmission detector module, a version of a received signal into one or more correlation magnitudes;
   determining a current detection threshold based on the one or more correlation magnitudes and a plurality of stored statistical values associated with previously determined detection thresholds,
   wherein each of the plurality of stored statistical values is provided with a respective weight based on at least one of a time associated with each stored statistical value and receiver information,
   wherein at least two of the respective weights are different from one another; and
   determining a burst transmission signal based on a comparison of the current detection threshold and the one or more correlation magnitudes.

2. The method of claim 1, further comprising down-converting the received signal to a baseband data rate.

3. The method of claim 2,
   wherein determining the current detection threshold is also based on at least one of data channel information and data channel congestion.

4. The method of claim 1, further comprising storing, at a storage module, at least one of the correlation magnitudes, the current detection threshold, and the plurality of statistical values.

5. The method of claim 1, wherein the plurality of statistical values include an average, a mean, a standard deviation, a smoothed average, an exponential moving average, or any combination thereof.

6. The method of claim 1, wherein converting, at the burst transmission detector module, the one or more correlation magnitudes includes applying on one or more correlation templates to the received signal.

7. The method of claim 6, further comprising:
   receiving, at a digital down converter module, the received signal; and
   converting, at the digital down converter module, the received signal to a baseband version of the received signal, and wherein the baseband version of the received signal is used to produce the one or more correlation magnitudes.

8. The method of claim 7, further comprising:
   receiving, at a analog-to-digital converter module, the received signal; and
   converting, at the analog-to-digital converter module, the received signal into a digital version of the received signal.

9. The method of claim 1, wherein the burst transmission signal comprises one or more data packets.

10. The method of claim 1, further comprising:
    demodulating, by a demodulator module, the burst transmission signal to form packet data.

11. The method of claim 10, further comprising:
    transmitting the packet data to a server.

12. A method for determining burst transmission signals, the method comprising:
    converting, at a burst transmission detector module, a version of a received signal into one or more correlation magnitudes;
    determining a smoothing parameter based on a number of false detections of burst transmission signals;
    determining a current detection threshold based on the one or more correlation magnitudes, one or more previously stored correlation magnitudes, a plurality of stored statistical values associated with previously determined detection thresholds, and the smoothing parameter; and
    determining a burst transmission signal based on a comparison of the current detection threshold and the one or more correlation magnitudes.

13. A computer program product, embodied in a non-transitory computer readable medium, the computer program product including instructions being operable to cause a data processing apparatus to:
    convert a version of a received signal into one or more correlation magnitudes;
    determine a current detection threshold based on the one or more correlation magnitudes and a plurality of stored statistical values associated with previously determined detection thresholds,
    wherein each of the plurality of stored statistical values is provided with a respective weight based on at least one of a time associated with each stored statistical value and receiver information,
    wherein at least two of the respective weights are different from one another; and
    determine a burst transmission signal based on a comparison of the current detection threshold and the one or more correlation magnitudes.

14. A system for detecting burst transmission signals, the system comprising:
    a burst transmission module comprising digital circuitry configured to:
        convert a version of a received signal into one or more correlation magnitudes,
        determine a current detection threshold based on the one or more correlation magnitudes and a plurality of stored statistical values associated with previously determined detection thresholds,
        wherein each of the plurality of stored statistical values is provided with a respective weight based on at least one of a time associated with each stored statistical value and receiver information,
        wherein at least two of the respective weights are different from one another; and
        determine a burst transmission signal based on a comparison of the current detection threshold and the one or more correlation magnitudes.

15. The system of claim 14, wherein the burst transmission module is further configured to determine the current detection threshold also based on at least one of data channel information and data channel congestion.

16. The system of claim 14, further comprising a storage module configured to store at least one of the one or more correlation magnitudes, the current detection threshold, and the plurality of statistical values.

17. The system of claim 14, further comprising:
a demodulator module configured to demodulate the burst transmission to form packet data.

18. A system for detecting a burst transmission, the system comprising:
means for converting a version of a received signal into one or more correlation magnitudes;
means for determining a current detection threshold based on the one or more correlation magnitudes and a plurality of stored statistical values associated with previously determined detection thresholds,
wherein each of the plurality of stored statistical values is provided with a respective weight based on at least one of a time associated with each stored statistical value and receiver information,
wherein at least two of the respective weights are different from one another; and
means for determining a burst transmission signal based on a comparison of the current detection threshold and the one or more correlation magnitudes.

* * * * *